United States Patent
Miura et al.

[11] Patent Number: 6,154,593
[45] Date of Patent: Nov. 28, 2000

[54] OPTICAL DEVICE AND FORMATION OF OPTICAL WAVEGUIDE USING LIGHT-INDUCED EFFECT ON REFRACTIVE INDEX

[75] Inventors: Kiyotaka Miura, 13-22, Syujaku 1-chome, Nara-shi, Nara-ken 631; Kenneth M. Davis, Nara; Kazuyuki Hirao, Kyoto, all of Japan

[73] Assignees: Japan Science & Technology Corp; Kiyotaka Miura, both of Japan

[21] Appl. No.: 09/333,109

[22] Filed: Jun. 15, 1999

Related U.S. Application Data

[63] Continuation of application No. 08/819,521, Mar. 17, 1997, Pat. No. 5,978,538.

[30] Foreign Application Priority Data

Mar. 18, 1996 [JP] Japan ....................................... 8-88920

[51] Int. Cl.[7] ..................................................... G02B 6/10
[52] U.S. Cl. .............................. 385/123; 65/386; 65/388; 65/389; 65/392; 385/129
[58] Field of Search ..................................... 385/123, 129, 385/141, 142; 65/386, 388, 389, 392

[56] References Cited

U.S. PATENT DOCUMENTS

| | | | |
|---|---|---|---|
| 3,542,536 | 11/1970 | Flam et al. | 65/111 |
| 4,022,602 | 5/1977 | Pavlopoulos | 65/102 |
| 4,090,776 | 5/1978 | Bernal et al. | 385/132 |
| 4,411,678 | 10/1983 | Arai | 65/3.12 |
| 4,710,605 | 12/1987 | Presby | 65/392 X |
| 5,136,677 | 8/1992 | Drexhage et al. | 385/123 |
| 5,620,496 | 4/1997 | Erdogan et al. | 65/425 |

*Primary Examiner*—John D. Lee
*Assistant Examiner*—Juliana K. Kang
*Attorney, Agent, or Firm*—Webb Ziesenheim Logsdon Orkin & Hanson, P.C.

[57] ABSTRACT

A glass 1 is irradiated with a focused pulsed laser beam 2 having a peak power density of $10^5$ W/cm$^2$ or more and a repetition rate of 10 KHz or more. The glass 1 irradiated with the laser beam 2 changes its refractive index at the focal point 4. During the laser beam irradiation, the glass 1 is continuously moved with respect to the focal point of the pulsed laser beam 2 or continuously scanned with the focused laser beam 2, so as to form the refractive index changed region (i.e. an optical waveguide 5) with a predetermined pattern. The glass 1 in which the optical waveguide 5 will be formed may be any kind of glass having high transparency.

3 Claims, 2 Drawing Sheets

OPTICAL DEVICE AND FORMATION OF OPTICAL WAVEGUIDE USING LIGHT-INDUCED EFFECT ON REFRACTIVE INDEX

RELATED APPLICATIONS

This application is a continuation of U.S. patent application Ser. No. 08/819,521, filed Mar. 17, 1997, now U.S. Pat. No. 5,978,538, issued Nov. 2, 1999.

BACKGROUND OF THE INVENTION

The present invention relates to an optical device in which an optical waveguide is formed therein and also relates to a method of producing such an optical device.

An optical waveguide useful for optical communication or the like has heretofore been formed in glass by an ion-exchange process or a flame hydrolysis process.

According to the ion-exchange process, $Ag^+$ ions are thermally diffused into a surface layer of a glass substrate through a slit-shaped opening of a thin metal film deposited on the glass substrate so as to form an optical waveguide in the surface layer by the first ion-exchange step to replace $Na^+$ ions in the glass with $Ag^+$ ions. A uniform electric field is then applied to the glass substrate in a $Na^+$ fused salt.

Thereafter, the surface layer of the glass is penetrated with $Na^+$ ions from fused salt. Due to the diffusion of $Na^+$ ions, a high refractive index region which was formed at the outmost layer by the diffusion of $Ag^+$ ions is submerged beneath the surface, so that the optical waveguide is embedded below the surface of the glass so as to ensure a characteristic of low propagation loss.

The core of the optical waveguide obtained in this manner generally has a semicircular or circular section of 10–200 $\mu$m in radius and a relative index difference of around 1%.

Since the change of refractive index is controlled by ion-exchange, the structure of the formed optical waveguide is limited to the part near the surface of the glass. In addition, the glass materials available for the waveguide formation are limited to those capable of ion-exchange. One further shortcoming is that the ion-exchange requires a relatively long time process resulting in poor productivity.

According to the flame hydrolysis process, minute glass particles are deposited on a silicon substrate by the flame hydrolysis of silicon tetrachloride and germanium tetrachloride, so as to form a duplicated glass layer for an under clad and a core. The accumulated minute glass particles are then reformed to a transparent glass layer by heat treatment at a high temperature. Thereafter, a core part is shaped to a predetermined pattern by photolithography or reactive etching and then a clad is formed.

The flame hydrolysis process involves complicated steps for the formation of an optical waveguide and only uses silica-based materials. In addition, it is difficult to form an optical waveguide having a circular section by the flame hydrolysis process, since the core is formed by etching.

Although an optical waveguide can be formed with various two-dimensional patterns by either the ion-exchange process or the flame hydrolysis process, it is nearly impossible to form channels with a three-dimensional pattern. Consequently, an optical waveguide circuit having a complicated structure cannot be obtained by these processes.

An object of the present invention is to provide an optical device in which an optical waveguide is formed with a high degree of freedom.

Another object of the present invention is to form such an optical waveguide in glass by the structural change which is induced by laser beam irradiation.

The inventors recognized the light-induced effect wherein the structure of glass is changed by laser beam irradiation, and have studied the feasibility of this effect for forming an optical waveguide.

SUMMARY OF THE INVENTION

An optical device according to the present invention includes a glass in which a refractive index changed region serving as an optical waveguide is formed in a continued state by laser beam irradiation.

The glass is selected from the group comprising an oxide glass, a halide glass, a sulfide a glass and a chalcogenide glass. The oxide glass may be one of a silicate, borate, sulphate, phosphate, fluorophosphate or bismuthate. The halide glass may be Type-$BeF_2$, $ZrF_4$, $InF_3$ or Cd—Zn—Cl. The sulphide glass may be Ga—La—S. The calcogenide glass may be Se—As.

The optical waveguide is formed by focusing a laser beam having sufficient energy to induce structural change in the glass at a focal point of the laser beam, and by relatively shifting the focal point with respect to the glass so as to form a continuous refractive index changed region through the glass.

The laser beam preferably has a peak power density of $10^5$ $W/cm^2$ or more at the focal point, although the necessary peak power density is changeable in response to the particular glass undergoing irradiation. The peak power density is the value obtained by converting the peak output (W), which is represented by the ratio of an output energy (J) per each pulse to a pulse duration (sec.), to a unit of irradiated surface area. If the peak power density is less than $10^5$ $W/cm^2$, the refractive index is scarcely changed so as not to form an optical waveguide in the glass.

The light-induced effect on a refractive index is accelerated with the increase of the peak power density, which facilitates the formation of an optical waveguide. However, it is practically difficult to use a laser beam of excessively quantitative energy. In this sense, the pulsed laser beam whose peak power density is intensified by narrowing its pulse duration is preferable for this purpose.

The optical waveguide formed in the glass is modified to a smooth structure by irradiation with a pulsed laser beam with a repetition rate higher than 10 KHz.

The laser beam is focused by a condenser lens or the like, in a manner such that a focal point is adjusted to the interior of the glass. When the focal point is relatively shifted inside the glass, a refractive index changed region effective as an optical waveguide is continuously formed in the glass. In practice, the glass is continuously scanned with the condensed beam, or the focal point is continuously shifted in the glass along a predetermined pattern.

DETAILED DESCRIPTION OF THE PREFERRED EMBODIMENTS

Figure 1:
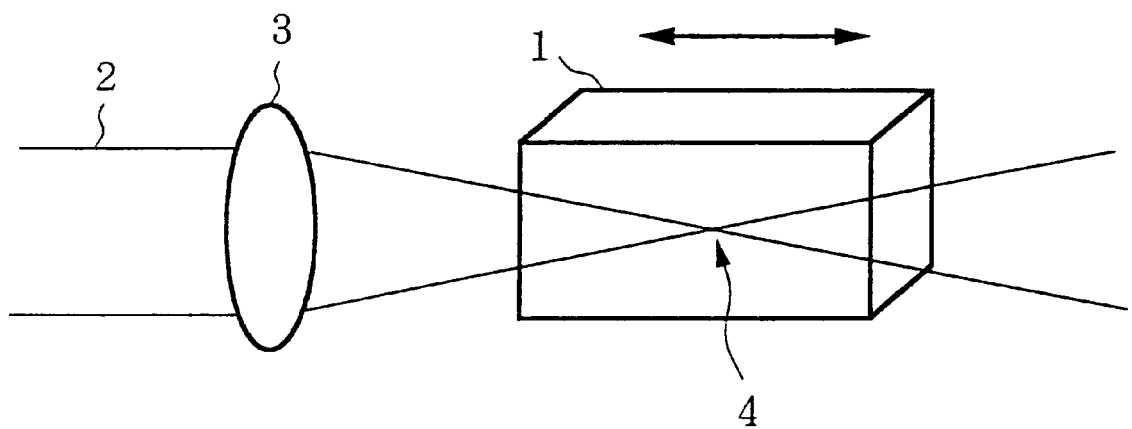
FIG. 1 is a schematic view illustrating the irradiation of a silica glass with a pulsed laser beam in Example 1.

The phenomenon that a refractive index is changed by laser beam irradiation is known as the light-induced effect and is typically observed in silicate glass containing P, Ce, Ge or the like. This effect is caused by the reaction of oxygen defects which exist in the glass. the oxygen defects have an intrinsic absorption in an ultraviolet wavelength region and partially change their structure when irradiated with a laser beam at the absorption wavelength. The light-induced effect has been researched so far using an excimer laser, i.e. a type of ultraviolet laser.

Such a laser beam has a repetition rate lower than 10 KHz but does not offer enough energy to the irradiated part. Therefore, the refractive index changed region is shaped only to a spot without continuation. If the repetition rate is forcibly increased with holding an average output power at a constant value, the energy per each pulse is decreased. Consequently, it is difficult to induce the structural change which causes the variation of the refractive index.

A pulsed laser beam having a repetition rate of 10 KHz or higher is useful for the formation of an optical waveguide, if a strong peak power density is obtained by making the pulse duration shorter. The refractive index is changed at a focal point regardless of the composition of the glass. Under this condition, the same phenomenon is generated by irradiation with a pulsed laser beam having a wavelength different from the intrinsic absorption wavelength of the glass. Even when a pulsed laser of wavelength similar to the intrinsic absorption wavelength of the glass is used, the light-induced effect on the refractive index is assured by applying the laser beam with a peak power density of $10^5$ W/cm$^2$ or more to a glass which exhibits weak absorbance.

This phenomenon is advantageously used for the formation of an optical waveguide, although the nature of the phenomenon is not clear. When the glass is continuously scanned with the laser beam, a refractive index changed region is continuously formed along the locus of the focal point due to the higher repetition rate. The refactive index changed region is used as an optical waveguide, since its refractive index is higher than the original refractive index of the glass.

In order to form a smooth waveguide structure, the pulse duration should be shorter. In other words, the repetition rate should be increased so as to apply the first and second pulses in the shortest possible time period. In this regard, the laser beam should have a repetition rate of 10 KHz or more, preferably 100 KHz or more. If the repetition rate is lower than 10 KHz, the laser beam is scattered to the glass without the induction of the refractive index change necessary for the formation of an optical waveguide.

The glass could be continuously irradiated with the laser beam by decreasing the motion speed of the glass or the scanning speed of the focal point. However, the second pulse is applied in an overlapped state at a predetermined time after the first irradiation pulse. Due to the overlapped irradiation, the refractive index changed by the first irradiation pulse would be re-changed by the second irradiation pulse. Consequently, a smooth waveguide structure would not be obtained.

The upper limit of the repetition rate is not particularly defined. For instance, a substantially continuous laser beam with a repetition rate near infinity could be used. However, when the repetition rate is increased too much, the energy for each pulse is weakened in general. In this regard, the upper limit of the repetition rate is determined by the energy threshold for changing the refractive index of the glass as well as the power of the laser used in the process.

The diameter of the optical waveguide is controllable by the power of the pulsed laser beam, the diameter of the focal point, and the like. The optical waveguide can be made larger in diameter by increasing the power of the pulsed laser or the diameter of the focal point. The rate of the refractive index change at the core can be controlled by the repetition of scanning. The rate of the refractive index change is made larger without the enlargement of the core in diameter, by increasing the scanning rate of the pulsed laser beam.

EXAMPLES

Example 1

Silicate glass having a composition of 95 wt. % $SiO_2$ and 5 wt. % $GeO_2$ was shaped to a rectangular parallelepiped sample having the dimensions of 10 mm×10 mm×5 mm. Sample 1 was irradiated with a pulsed laser beam 2 of 800 nm wavelength with a repetition rate of 200 KHz and a pulse duration of 150 femtoseconds. The pulsed laser beam 2 was emitted from a Ti:$Al_2O_3$ laser excited with an Ar laser beam and then focused by a condenser lens 3, as shown in FIG. 1.

The laser beam 2 was focused by the lens 3 in a manner such that a focal point 4 was adjusted to a location in the interior of Sample 1. After being irradiated with the laser beam 2, the refractive index of Sample 1 was made 0.02 higher at the focal point 4.

Figure 2:
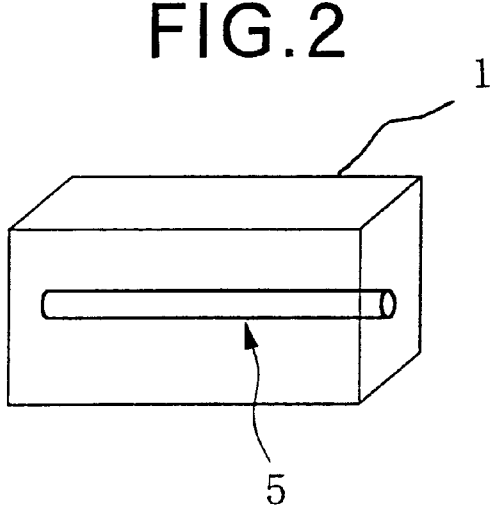
FIG. 2 is a schematic view illustrating an optical waveguide formed in the glass shown in FIG. 1.

The refractive index of Sample 1 was changed in a very short time period, such as on the order of nanoseconds or picoseconds. A straight high-refractive index region, useful as an optical waveguide 5, was formed in the sample 1 as shown in FIG. 2, by the continuous motion of the glass sample 1 or by continuous scanning with the focused laser beam 2.

The formation of the optical waveguide 5 was confirmed by the transmission of light only through the refractive index changed region when visible light was actually inputted to the sample 1. It was noted from a near-field pattern at the outgoing side that the optical waveguide had a circular section of 20 μm in diameter.

Ge-doped silicate glass was used in the above-mentioned Example. When other glasses such as high-purity silicate, phosphate, borate, fluorate, chlorate or sulfate glasses were irradiated with a laser beam in the same way, a similar optical waveguide was formed in the glass.

The optical waveguide formed in this way has very small interfacial loss, since a distinct boundary is not generated between the core and the clad. Therefore, it is believed the same process can be used for the formation of discrete waveguides in optical integrated circuits or the like.

Example 2

Figure 3:
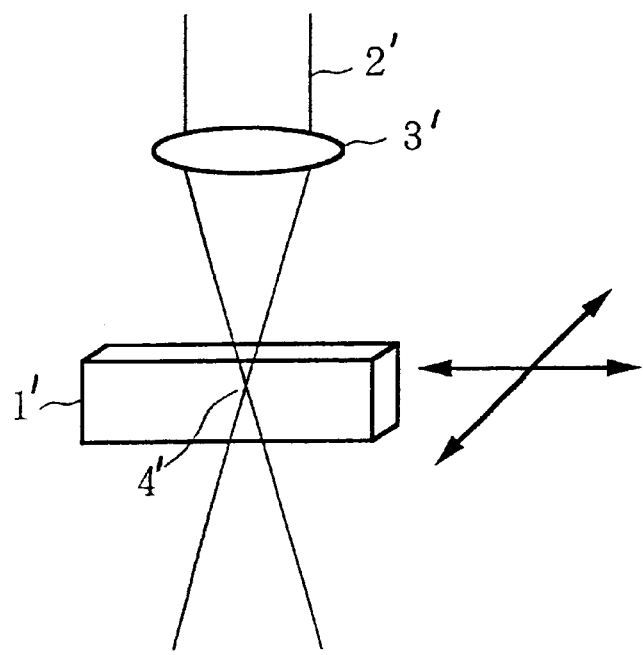
FIG. 3 is a schematic view illustrating the irradiation of a fluoride glass with a pulsed laser beam in Example 2.

A sample 1' shown in FIG. 3 having a rectangular parallelepiped shape of 20 mm×20 mm×5 mm was prepared from fluorate glass having a composition of 50 mole % $ZrF_4$, 5 mole % $LaF_3$, 5 mole % $AlF_3$, 20 mole % $BaF_2$ and 20 mole % NaF. The sample 1' was irradiated with a pulsed laser beam 2' focus through a lens 3' in the manner such that a focal point 4' was adjusted to a location in the interior of Sample 1'. The pulsed laser beam 2' had a wavelength of 1 μm and an average power of 150 mW with a pulse duration of 120 femtoseconds and a repetition rate of 50 KHz.

Figure 4:
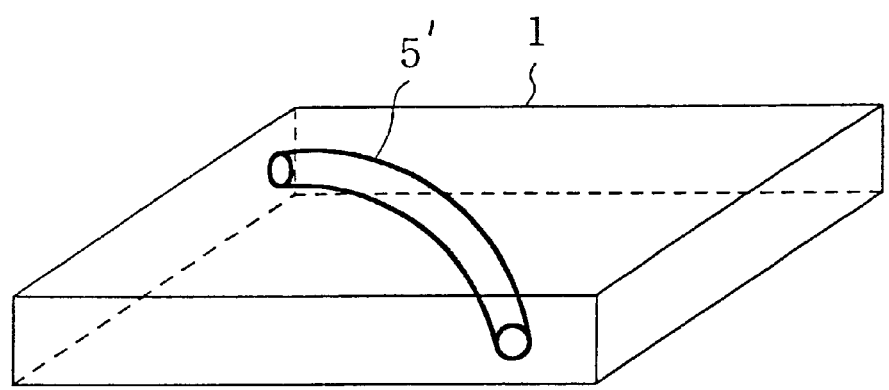
FIG. 4 is a schematic view illustrating an optical waveguide formed along a circular arc in the glass shown in FIG. 3.

In this Example, the focal point 4' was shifted along a circular arc. The formation of a refractive index changed region distinguishable from the surroundings in the sample 1' along the locus of the focal point 4' was noted by observation using an optical microscope. The formed region, as shown in FIG. 4, i.e. an optical waveguide 5', had a circular section of 12 μm in diameter.

When a He—Ne laser beam was inputted to the optical waveguide 5' at one side, the emission of the laser beam from the waveguide channel 5' at the other side was noted from the distribution of luminous energy in a near-field pattern. It was noted that the region reformed by laser beam irradiation had a relatively high refractive index when compared to the surroundings so as to form the waveguide structure.

When a focused laser beam was repeatedly applied to the optical waveguide 5. the laser beam emitted from the waveguide channel 5 at the other side was intensified. The rate of the refractive index change was increased in accordance with the increase of the repetition of the laser beam irradiation.

Further, a fluorate glass was irradiated with a laser beam whose wavelength was varied from 400 nm to 2 $\mu$m, while holding the pulse duration and the repetition rate of the laser beam at a constant level, to form an optical waveguide in the glass. The formation of the same optical waveguide in the glass was noted from the distribution of luminous energy in a near-field pattern at an outgoing side.

According to the present invention as aforementioned, a glass is irradiated with a pulsed laser beam having a peak power density sufficient to partially change the refractive index of the glass at the focal point, so as to form an optical waveguide in the glass. This process has the advantage that the optical waveguide can be easily formed without the necessity of complicated steps. In addition, the pattern of the optical waveguide can be controlled with a high degree of freedom by changing the moving direction of the glass with respect to the optical axis of the pulsed laser beam or the scanning direction of the focal point with respect to the glass. Therefore, the optical device obtained in this way has the structure that optical waveguides can be formed with complicated three-dimensional patterns useful for discrete optical circuits.

What is claimed is:

1. An optical device including an optical waveguide produced in a glass, said optical device produced according to the steps of:

focusing a laser beam having a peak power density of at least $10^5$ W/cm$^2$ at the focal point of said laser beam to induce a change of a refractive index at the interior of a glass, and relatively shifting the focal point of said laser beam in said glass so as to form a continuous region within the interior of said glass where the refractive index is changed.

2. The optical device as claimed in claim 1 wherein the glass is oxide glass or halide glass.

3. The optical device as claimed in claim 1 wherein the glass is sulphide glass or chalcogenide glass.

* * * * *